US010160515B2

(12) United States Patent
Minto et al.

(10) Patent No.: US 10,160,515 B2
(45) Date of Patent: Dec. 25, 2018

(54) DEVICE FOR ACTUATING THE FRONT DERAILLEUR OF A BICYCLE

(71) Applicant: Campagnolo S.r.l., Vicenza (IT)

(72) Inventors: Marco Minto, Mirano (IT); Christian Marangon, Thiene (IT)

(73) Assignee: CAMPAGNOLO S.R.L., Vicenza (IT)

( * ) Notice: Subject to any disclaimer, the term of this patent is extended or adjusted under 35 U.S.C. 154(b) by 0 days.

(21) Appl. No.: 15/892,781

(22) Filed: Feb. 9, 2018

(65) Prior Publication Data

US 2018/0229805 A1 Aug. 16, 2018

(30) Foreign Application Priority Data

Feb. 13, 2017 (IT) .......................... 102017000015349

(51) Int. Cl.
*B62M 25/04* (2006.01)
*B62M 9/1348* (2010.01)
(Continued)

(52) U.S. Cl.
CPC ............. *B62M 25/04* (2013.01); *B62K 23/06* (2013.01); *B62M 9/131* (2013.01); *B62M 9/1348* (2013.01); *F16C 1/18* (2013.01)

(58) Field of Classification Search
CPC ........ B62M 9/12; B62M 9/131; B62M 9/134; B62M 9/1342; B62M 9/1344;
(Continued)

(56) References Cited

U.S. PATENT DOCUMENTS 3,400,605 A 9/1968 Hood
3,924,487 A 12/1975 Huret et al.
(Continued)

FOREIGN PATENT DOCUMENTS

CN 104691699 A 6/2015
CN 204473057 U 7/2015
(Continued)

OTHER PUBLICATIONS

Italian Search Report and Written Opinion in Italian Application No. 102017000015349, dated Oct. 19, 2017, with English translation.

*Primary Examiner* — Prasad V Gokhale
(74) *Attorney, Agent, or Firm* — Volpe and Koenig, P.C.

(57) ABSTRACT

The invention relates to an actuation device for actuating the front derailleur of a bicycle, comprising a control pin, configured to be set in rotation by a control lever, rotatable about a rotation axis in a first angular direction between the first and last angular positions and in a second angular direction between the last and the first angular positions. A cable-winding bush rotates between the first and last winding positions. An indexer has a plurality of stop areas corresponding to angular positions between the first and the last angular positions. Elastic members makes the control pin form a unit with the cable-winding bush during rotations of the cable-winding bush between and among the various winding positions and to make the control pin rotatable with respect to the cable-winding bush between the last winding position of the cable-winding bush and the last angular position of the control pin.

20 Claims, 4 Drawing Sheets

(51) Int. Cl.
*B62M 9/131* (2010.01)
*B62K 23/06* (2006.01)
*F16C 1/18* (2006.01)

(58) Field of Classification Search
CPC .. B62M 9/1346; B62M 9/1348; B62M 25/00; B62M 25/02; B62M 25/04; F16C 1/10; F16C 1/12; F16C 1/18; B62K 23/06
See application file for complete search history.

(56) References Cited

U.S. PATENT DOCUMENTS

| | | | |
|---|---|---|---|
| 5,787,757 | A | 8/1998 | Ozaki |
| 6,367,347 | B1 | 4/2002 | Blaschke et al. |
| 7,305,903 | B2 | 12/2007 | Kawakami |
| 7,681,472 | B2 | 3/2010 | Weiss |
| 2007/0068312 | A1* | 3/2007 | Sato ................ B62K 23/06 74/502.2 |
| 2018/0009506 | A1* | 1/2018 | Minto ............... B62M 25/04 |
| 2018/0154983 | A1* | 6/2018 | Marangon ........ B62M 9/1242 |

FOREIGN PATENT DOCUMENTS

| | | |
|---|---|---|
| EP | 1554131 A1 | 7/2005 |
| EP | 1749738 A1 | 2/2007 |
| EP | 3100942 A1 | 12/2016 |
| GB | 1134807 | 11/1968 |

* cited by examiner

DEVICE FOR ACTUATING THE FRONT DERAILLEUR OF A BICYCLE

CROSS REFERENCE TO RELATED APPLICATION

This application claims the benefit of Italian Application No. 102017000015349, filed on Feb. 13, 2017, which is incorporated herein by reference as if fully set forth.

FIELD OF INVENTION

The present invention relates to an actuation device for actuating a front derailleur of a bicycle, adapted for being mounted on bicycle handlebars. Preferably, the bicycle is a racing bicycle.

BACKGROUND

A bicycle is normally provided with a rear derailleur active on a sprocket assembly, which consists of a series of coaxial toothed wheels (sprockets) having different diameters and numbers of teeth coupled with the hub of the rear wheel.

A bicycle can furthermore be provided with a front derailleur associated with a crankset, which consists of a series of toothed wheels (crown gears) having different diameters and number of teeth associated with a pin of the bottom bracket driven in rotation by crank arms.

Usually, there are two or three crown gears of the crankset having increasing diameters starting from the crown gear closest to the bicycle frame.

The derailleur, whether front or rear, engages a transmission chain extending in a closed loop between the sprocket assembly and the crankset, moving it on toothed wheels having a different diameter and number of teeth, so as to obtain different gear ratios.

In particular, downward gearshifting is when the chain passes from a toothed wheel having a larger diameter to a toothed wheel having a smaller diameter, and upward gearshifting is when the chain moves from a toothed wheel having a smaller diameter to a toothed wheel having a larger diameter. Concerning this, it should be noted that with reference to the front derailleur, downward gearshifting corresponds to the passage to a lower gear ratio and upward gearshifting corresponds to the passage to a greater gear ratio.

The movement in the two directions of the front derailleur is obtained through an actuation device mounted on the handlebars so as to be easy for the cyclist to maneuver.

More specifically, in a mechanical gearshift, the front derailleur is moved between the crown gears of the crankset, in a first (upwards) direction by a traction action exerted by a normally sheathed inextensible control cable (commonly called Bowden cable), in a second opposite (downward) direction by the release of the traction of the cable and by the elastic return action of a spring provided in the derailleur itself.

The front derailleur is actuated by a linkage that actuates a chain guide adapted for physically moving the chain between different engagement positions on the crown gears.

The chain guide comprises an inner plate and an outer plate substantially parallel to one another and substantially parallel to the planes of the crown gears. The inner plate is spaced from the outer plate and both are simultaneously and rigidly translated by the traction or by the release of the control cable.

During downward gearshifting, the outer plate of the derailleur intercepts the chain and derails it from the crown gear engaged, making it fall onto a smaller crown gear arranged closer to the frame.

During upward gearshifting, the inner plate of the derailleur intercepts the chain and derails it, accompanying it, towards a larger crown gear arranged further from the frame.

In the actuation device, the control cable is actuated in traction or in release through winding and unwinding on a rotor element, commonly called cable-winding bush, the rotation of which is actuated by the cyclist with a suitable control lever, or with two control levers (a first lever for upward gearshifting and a second lever for downward gearshifting).

In any case, the actuation device must foresee that the cable-winding bush is held in a number of predetermined angular positions, angularly spaced apart by predetermined indexing angles between a first and a last indexing position. This function is obtained with so-called indexers, many types of which are known in the field, variously active between the cable-winding bush and the fixed casing of the device.

In indexers, there are usually two, and sometimes even three, indexing positions when the transmission chain is positioned on the smallest crown gear of the crankset. This is to ensure correct positioning of the derailleur irrespective of the toothed wheel of the sprocket assembly engaged by the transmission chain.

For the same reason, there are usually two indexing positions when the transmission chain is positioned on the largest crown gear of the crankset.

A pair of mechanical end stops, and in particular an inner end stop and an outer end stop, limit the excursion of the derailleur to prevent it from derailing the chain too much towards the frame or too far away from the frame (thus ensuring that the chain does not derail beyond the crown gears).

Although the derailleur has a predetermined geometry, its effective excursion following the actuation of the actuation device is a function of the effective mounting configuration of the derailleur and of the actuation device, said mounting configuration, even if actuated within predetermined mounting tolerances, varying from case to case. For example, the effective force (or tension) transmitted by the control cable following the same rotation of the cable-winding bush (also) depends on the particular path followed by the control cable to reach the derailleur, on the way in which the control cable has been connected to the derailleur and on many other factors linked to the installation of the derailleur and of the control device on the bicycle.

Clearly, such variations of the effective excursion of the derailleur are small in size, but they are sufficient in size that it is not possible to ensure that the total excursion of the derailleur (useful for carrying out all gearshifting operations) corresponds exactly to the angular excursion of the cable-winding bush between the first and the last indexing position.

The indexing positions and the relative controls are therefore sized so as the ensure correct gearshifting also in the most unfavorable mounting situation, implying that the angular distance between the first and the last indexing position corresponds to a useful stroke of the derailleur that is greater than what is actually necessary.

For this reason, the mechanical end stops of the derailleur are usually adjusted so that the outer end stop acts as a stop for the excursion of the derailleur when the cable-winding bush is held in the last indexing position, in other words in the indexing position reached after the last upward gearshifting.

In this way, it is possible to ensure for the cyclist that the last upward gearshifting operation is obtained and stably maintained.

The inner end stop is adjusted to ensure that the derailleur is positioned on the smallest toothed wheel of the crankset avoiding sliding of the transmission chain on the derailleur when the transmission chain is engaged on the largest toothed wheel of the rear cassette.

In this way, according to the above, the excursion of the derailleur is stopped before the cable-winding bush reaches the first indexing position. However, the action exerted by the cyclist on the control in any case carries the cable-winding bush into the first indexing position, making the gearshifting stable. Indeed, in this situation (downward gearshifting) the rotation of the cable-winding bush towards the first indexing position causes a loosening of the control cable that thus does not prevent the rotation of the cable-winding bush.

The Applicant has noted that the adjustment of the mechanical end stops of the aforementioned derailleur results in a lower responsiveness at least in the first upward gearshifting. This is since the first part of the first upward gearshifting does not cause any movement of the derailleur and has the sole purpose of recovering the tension of the control cable.

The Applicant has perceived that by adjusting the inner mechanical end stop exactly at the first indexing position there would be an immediate and rapid response in the first upward gearshifting operation.

The Applicant has however found that in this way the outer mechanical end stop should be adjusted so as to interrupt the rotation of the cable-winding bush before it reaches the last indexing position. The reaching of the stable position of the cable-winding bush on the last indexing position would be strongly counteracted by the fact that the control cable should be wound further on the cable-winding bush with the derailleur impeded by the outer end stop to carry out a further translation.

SUMMARY

The Applicant has perceived that by providing elastic members that are active, directly or indirectly, between a control pin and a cable-winding bush and allowing the control pin to rotate with respect to the cable-winding bush in opposition to the elastic members only when the cable-winding bush has reached the last winding position, it is possible to make the control pin reach the last stop area of the indexer without making the cable-winding bush rotate further, allowing a stable position to be reached on the indexer. The control pin thus remains stably held by the indexer and also holds the cable-winding bush in position by means of the elastic members.

BRIEF DESCRIPTION OF THE DRAWINGS

The features and advantages of the invention will become clearer from the following description of preferred embodiments thereof, made with reference to the attached drawings. In such drawings.

DESCRIPTION OF THE PREFERRED EMBODIMENTS

The present invention therefore relates to an actuation device for actuating the front derailleur of a bicycle comprising:

a control pin, configured to be set in rotation by a control lever, rotatable about a rotation axis in a first angular direction between a first angular position and a last angular position and in a second angular direction between the last angular position and the first angular position, a cable-winding bush angularly rotatable about said rotation axis in said first angular direction to wind a control cable between a first winding position and a last winding position and in said second angular direction to unwind said control cable between the last winding position and the first winding position, an indexer configured to define a plurality of stop areas for the rotation of said control pin, each stop area corresponding to an angular position comprised between said first angular position and said last angular position of said control pin, elastic members active between said control pin and said cable-winding bush configured to fixedly connect the control pin to the cable-winding bush during rotations of the latter between the first winding position and the last winding position and between the last winding position and the first winding position and to make said control pin rotatable with respect to said cable-winding bush between the last winding position of the cable-winding bush and the last angular position of the control pin.

Rotations of the cable-winding bush in the first angular direction correspond to tractions of the control cable that determine movements of the derailleur towards upward gearshifting operations whereas rotations of the cable-winding bush in the second angular direction correspond to releases of the control cable that determine movements of the derailleur towards downward gearshifting operations.

The rotation of the cable-winding bush is controlled by the rotation of the control pin and is transmitted to the cable-winding bush by means of the elastic members.

The tension of the control cable, and thus the torque that the control pin must transmit to the cable-winding bush, varies between the first winding position of the control cable on the cable-winding bush and the last winding position of the control cable on the cable-winding bush.

Such a variation in the tension of the control cable is not necessarily linear and the tension of the control cable is not necessarily minimum at the first winding position, but is a function of the geometry of the derailleur, of the path followed by the control cable and of other parameters.

The stop areas of the indexer allow the control pin to reach stable angular positions and allow them to be maintained even after the release of the control lever. When the control pin is in a stable angular position, the elastic members oppose rotations of the cable-winding bush, which remains stably locked in the angular position taken up.

By providing elastic members that are active, directly or indirectly, between the control pin and the cable-winding bush and allowing the control pin to rotate with respect to the cable-winding bush in opposition to the elastic members only when the cable-winding bush has reached the last winding position, it is possible to make the control pin reach the last stop area of the indexer without making the cable-winding bush rotate further, allowing a stable position to be reached on the indexer. The control pin thus remains stably held by the indexer and also holds the cable-winding bush in position by means of the elastic members.

In this way, the first winding position of the control cable on the cable-winding bush can be made to correspond to a positioning of the derailleur at the inner end stop.

The last winding position of the control cable on the cable-winding bush can be made to correspond to a positioning of the derailleur at the outer end stop.

In this way, it is possible to adjust the outer end stop of the front derailleur so that the latter is capable of taking the transmission chain on the largest crown gear of the crankset without the need, in such a position of the derailleur, for the cable-winding bush and the control pin to be arranged at the last stop area of the indexer.

The torque necessary to take the control pin into the last stop area does not cause an exponential increase of the tension of the control cable, since the control pin can rotate with respect to the control cable.

This makes it possible to adjust the inner end stop of the front derailleur so that in such a position the cable-winding bush and the control pin are arranged so as to coincide with the first stop area of the indexer. In this way, immediate and rapid upward first gearshifting is ensured.

Moreover, since it is possible to ensure that the first winding position of the cable-winding bush, corresponding to the positioning of the derailleur at the inner end stop, is stably held in the first stop area of the indexer it is possible to eliminate the stop area of the indexer usually used only to recover the tension of the control cable before the first upward gearshifting operation.

The actuation device for actuating the control cable of a front derailleur of a bicycle of the present invention can comprise one or more of the following preferred features, taken individually or in combination.

The control pin, the cable-winding bush and the indexer are preferably arranged in a fixed casing with respect to the rotation axis and shaped for fixing to bicycle handlebars.

Preferably, the angular excursion between the first angular position and the last angular position of the control pin is greater than the angular excursion between the first winding position and the last winding position of the cable-winding bush.

This allows the cable-winding bush to carry out only the angular excursion necessary to move the derailleur between the inner end stop and the outer end stop, leaving the control pin the task of locking in the stop areas of the indexer even when the angular distance between the first and the last stop area is greater than the useful excursion of the cable-winding bush.

Preferably, said rotation of the control pin with respect to said cable-winding bush between the last winding position of the cable-winding bush and the last angular position of the control pin elastically deforms said elastic members.

In this way, the elastic return of the elastic members opposes a rotation of the cable-winding bush in the second angular direction with respect to the control pin when this reaches the last stop area, allowing the cable-winding bush to also be locked in position.

Preferably, said elastic members remain undeformed when a torque transmitted from the control pin to the cable-winding bush is equal to or less than the torque that the control pin exerts on the cable-winding bush to take the latter from the first to the last angular position.

This makes it possible to fixedly connect the control pin and the cable-winding bush to one another when the control cable moves the derailleur between the inner end stop and the outer end stop.

In the present description and in the attached claims, when referring to the torque transmitted to the cable-winding bush when the latter is in the last winding position, it should be taken to mean, unless specified otherwise, the torque transmitted to the cable-winding bush by the control pin when the elastic members are undeformed, in other words the torque necessary and sufficient to move the derailleur at the outer end stop.

Preferably, said elastic members elastically deform when a torque transmitted from the control pin to the cable-winding bush is greater than the torque exerted on the cable-winding bush in any angular position comprised between the first and the last winding position.

In this way, the torque necessary to take the pin into the last stop position remains low and, in particular, equal to the torque necessary to elastically deform the elastic members. The tension transmitted to the control cable by the cable-winding bush thus remains low and equal to the torque necessary to elastically deform the elastic members.

Moreover, proceeding with downward gearshifting starting from the last stop area of the indexer it is possible to rotate the control pin in the second angular direction without the cable-winding bush initially rotating (since it is counteracted by the elastic deformation of the elastic members to rotate in the second angular direction), ensuring that the synchrony between the angular positions of the cable-winding bush and of the stop areas of the indexer is always respected.

Preferably, said indexer comprises a rotary member rotating about the rotation axis as a unit with the control pin and a stationary member mounted in a non-rotary manner with respect to the control pin, wherein one from the rotary member and the stationary member is provided with at least one pointer slidably engaged on a fastening track equipped with said plurality of stop areas provided on the other member.

Preferably, said fastening track is formed on said stationary member and said mobile member comprises a ball-carrying disc on which said pointers are slidably foreseen.

This configuration of the indexer ensures excellent efficiency thereof and easy reaching of stable angular positions of the control pin and of the cable-winding bush.

Preferably, in a first embodiment of the invention said elastic members comprise a torsion spring active between said cable-winding bush and said control pin, said torsion spring being mounted with a higher torsion preload than the torque transmitted to the cable-winding bush in any angular position comprised between the first and the last winding position.

In this way, the torsion spring acts as a rigid mechanical connection element between the control pin and the cable-winding bush during the excursion of the front derailleur between the inner end stop and the outer end stop, in other words between the first and the last winding position of the control cable on the cable-winding bush, whereas the torsion spring yields elastically, releasing the control pin and the cable-winding bush in rotation, when the control pin must reach the last stop area.

Preferably, said cable-winding bush is mounted with a rotational play, about the rotation axis, on said control pin, so as to allow a relative rotation between control pin and cable-winding bush when said torsion spring elastically deforms.

The rotational play in the coupling between cable-winding bush and control pin allows a wider angular excursion of the control pin than the angular excursion of the cable-winding bush, so that there is no mechanical obstacle to reaching the last stop area by the control pin when the cable-winding bush is impeded in its angular rotation by the abutment of the derailleur on the outer end stop.

Preferably, said rotational play is determined by a difference in shape between the control pin and a hole in the cable-winding bush in which the control pin is inserted.

Preferably, in a second embodiment of the invention, a slider is active between said control pin and said cable-winding bush to constrain them in rotation, said elastic members being active on said slider.

The slider acts as a rigid mechanical connection element between the control pin and the cable-winding bush during the excursion of the front derailleur between the inner end stop and the outer end stop.

Preferably, said elastic members comprise a linear spring inserted in a seat of the cable-winding bush and active on said slider to push the slider in a recess of the control pin; said slider transferring a force to said spring proportional to the torque transmitted from the control pin to the cable-winding bush.

In this way, by suitably calibrating the linear spring, the control pin and the cable-winding bush are always fixedly connected during the excursion of the front derailleur between the inner end stop and the outer end stop.

Preferably, a preload dowel is active on said linear spring to adjust the preload thereof so that the linear spring deforms making the slider move back from said recess for torque transmitted to the cable-winding bush greater than or equal to the torque transmitted to the cable-winding bush in any angular position comprised between the first and the last winding position.

In this way, the slider no longer constrains the control pin to the cable-winding bush and allows the control pin to rotate with respect to the cable-winding bush to reach the last stop area of the indexer.

Preferably, in a third embodiment of the invention, a ferrule is fixedly connected to said control pin and is active on said cable-winding bush; said ferrule comprising radially outer projections inserted in radially inner seats of said cable-winding bush; said radially outer projections comprise a first and a second shoulder; said first shoulder being in abutment against a first wall of the radially inner seats for rotations in the second angular direction of the control pin.

In this way, the ferrule acts as a connection element between the cable-winding bush and the control pin.

Preferably, said elastic members comprise an insert made of elastomeric material inserted in said radially inner seats of the cable-winding bush and active between them and said radially outer projections of the ferrule.

In this way, the torque exerted by the control pin on the cable-winding bush passes through the insert made of elastomeric material, the elastic properties of which can be selected as a function of the desired rigidity in the coupling between control pin and cable-winding bush.

Preferably, said insert made of elastomeric material is inserted between the second shoulders of the projections and second walls of the radially inner seats; said insert made of elastomeric material elastically deforming by rotations of the control pin in said first angular direction when a torque transmitted from the control pin to the cable-winding bush is greater than the torque exerted on the cable-winding bush in any winding position comprised between the first and the last winding position.

Referring now to the attached figures, preferred embodiments of an actuation device for actuating the front derailleur of a bicycle in accordance with the present invention are described in detail. The actuation device is wholly indicated with 10.

Figure 1:
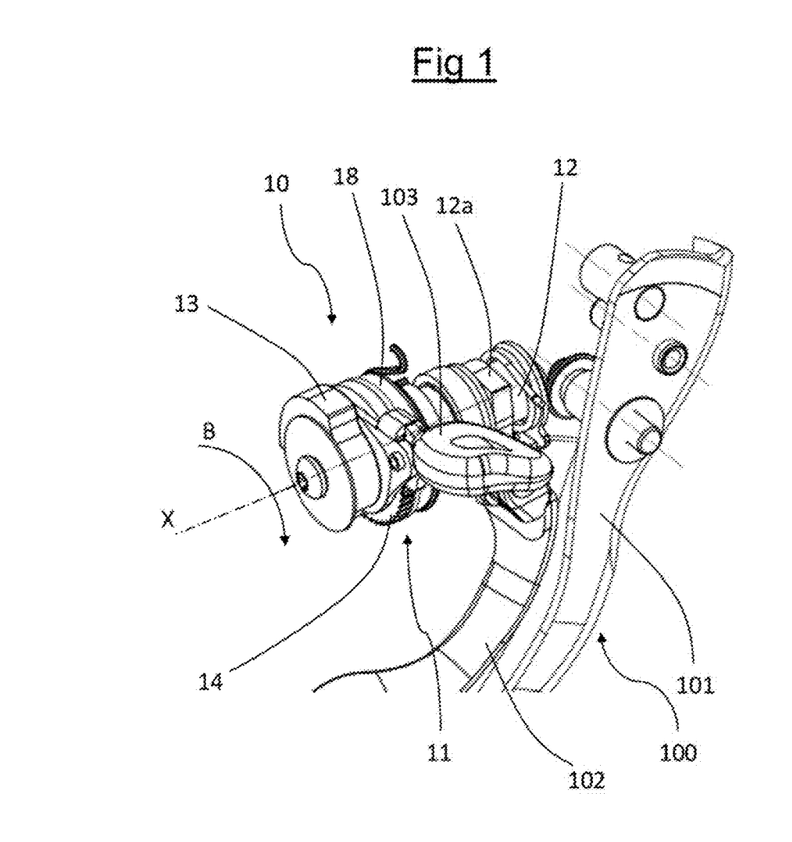
FIG. 1 is a perspective view, with some parts removed to better highlight others of an actuation device for actuating a front derailleur of a bicycle according to the invention.

Preferably, the actuation device 10 is included in an integrated brake-gearshift actuation device 100 of the bicycle, as shown for example in FIG. 1.

The device 10 comprises a casing, which preferably also supports a brake lever 101, which is fixed to the handlebars of a bicycle in a conventional manner, for example through a strap.

In the casing there is a control pin 12, rotatable inside the casing about a rotation axis X. The rotation axis X is the main reference axis for the elements that belong to the device 10; all of the indications of direction and similar, such as "axial", "radial", "circumferential", "diametral" will refer to it; equally, the indications "outwards" and "inwards" referring to radial directions should be taken to mean away from the rotation axis X or towards the rotation axis X. Two opposite angular directions, a first A and a second angular direction B, respectively, are defined about the rotation axis X.

The control pin 12 is angularly rotatable about the rotation axis X in the first A and in the second angular direction B between a first angular position and a last angular position.

Figure 3:
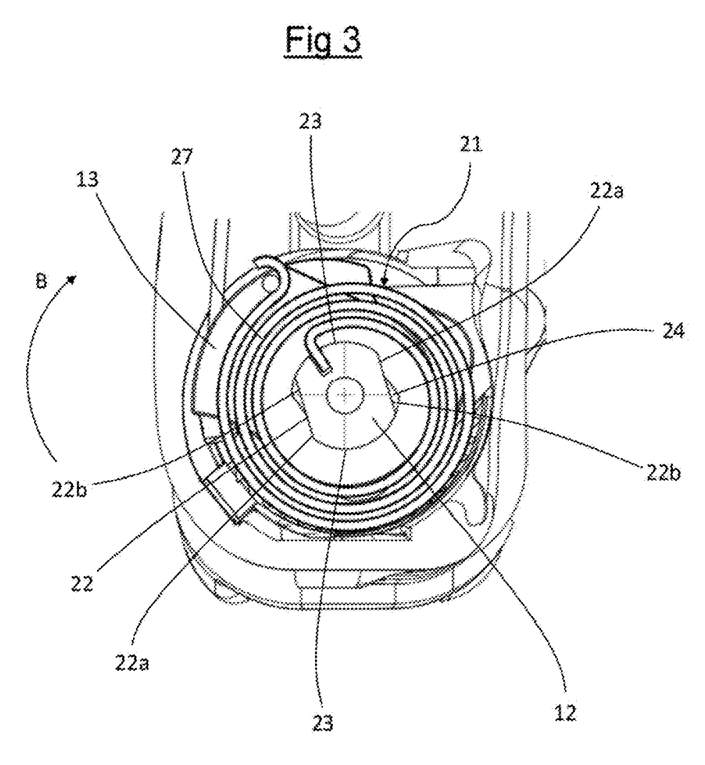
FIGS. 3 and 4 are schematic views of some details of the device of FIG. 1 in accordance with a first embodiment of the invention.
Figure 4:
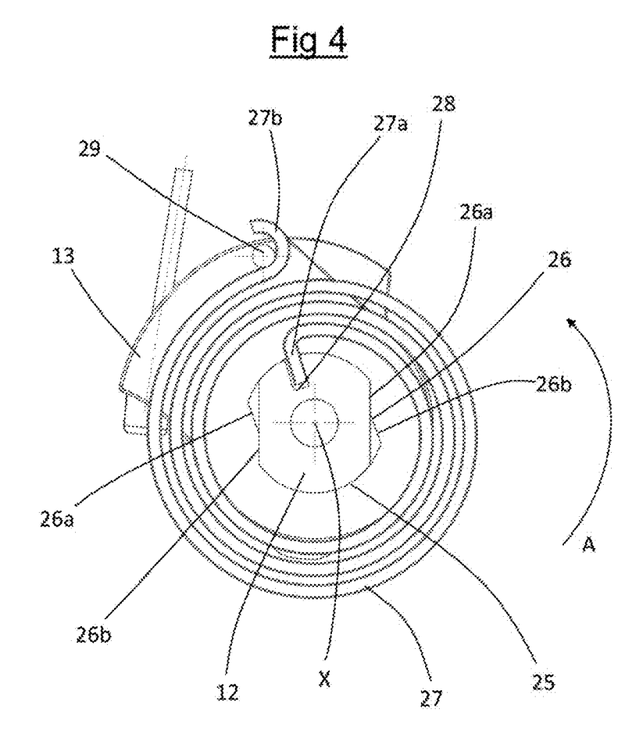

The control pin 12 is set in rotation, preferably through an engagement bush 12a as shown in FIG. 1 or through further or different linkages, by an actuation lever 102 to rotate in the first angular direction A and by a further actuation lever 103 to rotate in the second angular direction B, see FIGS. 3 and 4.

The device 10 further comprises a cable-winding bush 13, to which a control cable is fixed and on which the latter is wound, at a first end. The other end of the control cable is fixed to the front derailleur (not illustrated) so as to control the movement thereof with respect to the toothed wheels of a crankset (not illustrated).

The cable-winding bush 13 is mounted in the casing and is angularly rotatable about the rotation axis X in the first A and in the second angular direction B. The cable-winding bush 13 can rotate between a first angular position of winding of the control cable and a last angular position of winding of the control cable and vice-versa.

Between the first winding position and the last winding position there are intermediate angular positions of the cable-winding bush 13 that are distinct from one another and angularly spaced by indexing angles. Each angular position of the cable-winding bush 13 corresponds to an angular position of the front derailleur with respect to the crown gears of the crankset.

In particular, the first winding position corresponds to a positioning of the transmission chain at the smallest crown gear of the crankset. The last winding position corresponds to a positioning of the transmission chain at the largest crown gear (in other words having the largest diameter) of the crankset.

The front derailleur is provided with mechanical end stops, and in particular an inner end stop to limit the downward excursion of the derailleur and an outer end stop to limit the upward stroke of the derailleur.

The mechanical end stops are adjusted so that in the first winding position of the cable-winding bush 13 the derailleur is in abutment on the inner end stop and in the last winding position of the cable-winding bush 13 the derailleur is in abutment on the outer end stop.

The cable-winding bush 13 rotates as a unit with the control pin 12 in the entire angular excursion of the cable-winding bush 13 between the first winding position and the last winding position (and vice-versa), so that the actuation of the control pin 12 (through the control lever) by the cyclist determines useful gearshifting operations of the front derailleur.

Figure 2:
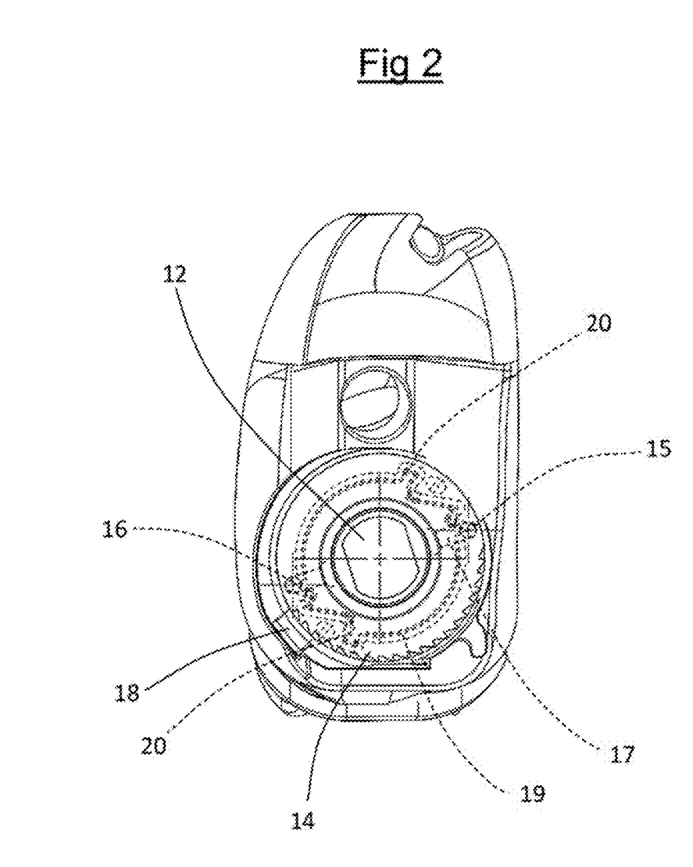
FIG. 2 is a rear view with some parts removed to better highlight others, of the device of FIG. 1.

The device 10 further comprises an indexer 11 to allow the control pin 12 (and therefore the cable-winding bush 13) to take up stable angular positions. The indexer 11 is equipped with a rotary member 14 mounted in the casing in a rotary manner about the rotation axis X. The rotary member 14 rotates as a unit with the control pin 12. Preferably, the rotary member 14 is a substantially cylindrical ball-carrying disc equipped with a first pointer 15 and a second pointer 16 (FIG. 2). The two pointers 15, 16 are preferably spherical bodies.

Each pointer 15, 16 is radially slidable in respective opposite radial throats 17 formed in the ball-carrying disc 14. The two pointers 15, 16 are elastically biased outwards in the throats 17 by respective springs (not illustrated) mounted in the throats 17. The springs position the pointers 15, 16 at the radial end of the respective throat 17. The throats 17 are open on one side of the ball-carrying disc 14 so that the pointers emerge partially from the axial bulk of the ball-carrying disc 14, making pointers projecting in the axial direction.

The indexer 11 further comprises a stationary member 18, stationary in rotation with respect to the control pin 12, arranged in the casing and provided with two fastening tracks 19. The stationary member 18 is preferably an indexing bush. The two pointers 15, 16 are engaged on a respective fastening track 19.

Each fastening track 19 directly faces the ball-carrying disc 14 so that the pointers 15, 16 engage the respective fastening track 19. The depth of each fastening track 19 is such as to receive the portion of pointers 15, 16 that emerges axially from the ball-carrying disc 14.

Each fastening track 19 comprises respective stop areas 20 engageable in sequence by the two pointers 15, 16. The stop areas 20 determine stable positions for the pointers along the fastening track 19.

Preferably, the two fastening tracks 19 are identical to one another and angularly spaced by 180°, so that identical stop areas 20 are angularly spaced by 180°.

When the control pin 12, actuated by the respective control lever, sets the ball-carrying disc 14 in rotation, each pointer 15, 16 passes from one stop area to an adjacent stop area taking the control pin 12 into a stable position and preventing a further rotation thereof (which can only occur by acting again on the control lever).

In particular, during upward gearshifting, the ball-carrying disc 14 rotates with respect to the indexing bush 18 in the first angular direction A and the two pointers 15, 16 slide in the fastening track and reach a subsequent stop area.

During downward gearshifting, the ball-carrying disc 14 rotates with respect to the indexing bush 18 in the second angular direction B and the two pointers 15, 16 slide in the fastening track and reach a previous stop area.

Although two fastening track 19 and two pointers 15, 16 have been described, it is possible for there to be a single fastening track 19 engaged by a single pointer 15.

As stated above, the control pin 12 and the cable-winding bush 13 form a unit during rotations about the rotation axis X during the entire angular excursion of the cable-winding bush 13.

The control pin 12 is rotatable with respect to the cable-winding bush 13 for a rotation of the control pin 12 in the first angular direction A beyond the last winding position of the cable-winding bush 13.

In other words, the control pin 12 can rotate in the first angular direction A and the cable-winding bush 13 can remain still when the cable-winding bush is in the last winding position.

The further rotation of the control pin 12 in the first angular direction A determines a further rotation of the ball-carrying disc 14 (which still rotates as a unit with the control pin 12) that carries the pointers 15, 16 to reach the last stop area 20 on the fastening track 19.

Similarly, the control pin 12 can rotate with respect to the cable-winding bush 13 in the second angular direction B between the angular position reached in the last stop area and the last angular position of winding of the cable-winding bush 13.

In this way, the angular position of the cable-winding bush 13 at the first winding position corresponds to the engagement of the pointers 15, 16 in the first stop area 20 of the respective fastening tracks 19. This position of the cable-winding bush 13, as stated, corresponds to a positioning of the front derailleur at the smallest crown gear, in particular beside the inner end stop of the derailleur.

By carrying out upward gearshifting, the control pin 12, the ball-carrying disc 14 and the cable-winding bush 13 rotate in the first angular direction A and the pointers 15, 16 are positioned at successive stop areas 20 of the fastening track 19.

When the cable-winding bush 13 reaches the last winding position, the derailleur is locked upwards against the outer end stop (with the transmission chain on the largest crown gear of the crankset) but the ball-carrying disc 14 has not yet taken the pointers 15, 16 into the last stop area 20 of the fastening track 19.

The control pin 12 and the ball-carrying disc 14 can, however, continue its rotation, with the cable-winding bush 13 and the derailleur stationary in the position reached, until the last stop area 20 is reached, abutting on it.

During the first downward gearshifting operation from the aforementioned position, the control pin 12 and the ball-carrying disc 14 rotate in the second angular direction B with respect to the cable-winding bush 13 until they reach the angular position occupied by the latter. At this point, the control pin 12 and the cable-winding bush 13 (as well as the ball-carrying disc 14) go back to rotating as a unit, allowing the downward gearshifting to be completed.

In order to allow the cable-winding bush 13 to rotate together with the control pin 12 during rotations between the first winding position and the last winding position and vice-versa, there are elastic members 21 active directly or indirectly between the cable-winding bush 13 and the control pin 12.

Such elastic members 21 elastically deform, allowing the control pin 12 to rotate with respect to the cable-winding bush 13, only when the control pin 12 transfers to the cable-winding bush 13 a torque of size greater than a predetermined threshold.

Such a predetermined threshold is given by the maximum torque transmitted to the cable-winding bush 13 necessary to rotate it from the first to the last angular position.

It should be noted that when the cable-winding bush 13 is in the last winding position (and therefore the derailleur is in abutment on the outer end stop) and the control pin 12 is given a further rotation in the first angular direction A, the cable-winding bush 13 is prevented from rotating further in the first angular direction A and the torque transmitted to the cable-winding bush 13 can substantially increase without producing any movement of the derailleur but causing just an increase in the tension of the control cable (due to the intrinsic deformability of the linkage of the entire device 10).

The elastic members 21, by deforming, avoid, or in any case greatly limit, the increase in tension of the control cable and allow the control pin 12 to rotate with the cable-winding bush 13 stationary in the position reached.

The rotation of the control pin 12 takes the ball-carrying disc 14 (fixedly connected to it) to abut on the last stop area 20, locking the control pin 12 in the position reached.

In this position, the ball-carrying bush 13 continues to remain in the position reached (last winding position) since the deformed elastic members 21 exert a return torque (due to the elastic return thereof) on the cable-winding bush 13 that opposes the rotation of the cable-winding bush 13 in the second angular direction B.

When the control pin 12 is given a rotation in the second angular direction B and the ball-carrying disc 14 disengages from the last stop area 20, the control pin 12 rotates in the second angular direction B with respect to the cable-winding bush 13 (which remains stationary) until the elastic return of the elastic members stops.

Such a condition occurs when the control pin 12 reaches the position in which the elastic members 21 had started to deform, in other words the position with respect to which the cable-winding bush 13 is in the last winding position. Only in this condition the elastic members 21 stop preventing the cable-winding bush 13 from rotating in the second angular direction B.

At this point, the control pin 12 and the cable-winding bush 13 go back to rotating as a unit.

In a first preferred embodiment of the invention, illustrated in FIGS. 3 and 4, the cable-winding bush 13 is mounted with a rotational play on the control pin 12, so that the latter can rotate, in the conditions described above, with respect to the cable-winding bush 13.

In this embodiment, the cable-winding bush 13 is mounted coaxially to the control pin 12 about the rotation axis X. The control pin 12 has a prismatic shape and, perpendicular to the rotation axis X, has a section given by two straight lines 22, opposite and parallel to one another joined by curvilinear sides 23. Preferably, the curvilinear sides 23 are shaped like an arc of circle with center coinciding with the rotation axis X, as illustrated in FIG. 3.

The cable-winding bush 13 has a central aperture 24 crossed by the control pin 12. The central aperture 24 is delimited by two edges with curvilinear extension 25 having the same curvature as the curvilinear sides 23 of the section of the control pin 12. The extension of the two edges with curvilinear extension 25 is greater than the extension of the curvilinear sides 23. Preferably, the two edges with curvilinear extension 25 are also shaped like an arc of circle with center coinciding with the rotation axis X and extend for a circular sector greater than the circular sector of extension of the two curvilinear sides 23.

Between two edges with curvilinear extension 25, the central aperture 24 is delimited by two side edges 26. Each side edge 26 has a first rectilinear segment 26a directed radially towards the rotation axis X. A second rectilinear segment 26b is connected to the first rectilinear segment and moves radially away from the rotation axis X. The joining points of the first rectilinear segment 26a with the second rectilinear segment 26b of the two side edges 26 are aligned on a line perpendicular to and passing through the rotation axis X. Such a line ideally divides the central aperture 24 into two parts that symmetrically mirror one another. The joining points of the first rectilinear segment 26a with the second rectilinear segment 26b of the two side edges 26 are the points of the edge of the central aperture 24 radially closest to the rotation axis X.

When the cable-winding bush 13 is mounted on the control pin 12, it can rotate freely with respect to the control pin 12 for an angular extension equal to the difference in the angular extension between the edges with curvilinear extension 25 of the central aperture 24 of the cable-winding bush 13 and the curvilinear sides 23 of the control pin 12.

In this embodiment, the elastic members 21 comprise a torsion spring 27 mounted with a preload between the cable-winding bush 13 and the control pin 12.

The preload force of the torsion spring 27 acts so as to keep, between the first and the last winding position of the cable-winding bush 13, a first portion 22a of a straight side 22 of the control pin 12 in abutment against the first rectilinear segment 26a of a side edge 26 of the central aperture 24 of the cable-winding bush 13. A second portion 22b of such a straight side 22 of the control pin 12, on the other hand, is free, in other words it does not abut the edge of the hole 24 of the cable-winding bush. A first portion 22a of the other straight side 22 of the control pin 12 (diametrically opposite the aforementioned first portion 22a) is in abutment against the second rectilinear segment 26b of the other side edge 26 of the central aperture 24 of the cable-winding bush 13, whereas the second portion 22b of the other straight side 22 of the control pin 12 (diametrically opposite the aforementioned second portion 22b), on the other hand, is free, in other words it does not abut the edge of the hole 24 of the cable-winding bush, as illustrated in FIG. 3.

In other words, the torsion spring 27 nullifies the rotational play between the cable-winding bush 13 and the control pin 12 when the cable-winding bush 13, and with it the control pin 12, is in any angular position comprised between the first and the last winding position.

The torque that the torsion spring transmits between the cable-winding bush 13 and the control pin 12 (which makes it possible to nullify the rotational play) is greater than the torque necessary to take the cable-winding bush 13 into any angular position comprised between the first and the last winding position.

When the cable-winding bush 13 is in the last winding position and the derailleur is in abutment on the outer end stop, the torsion spring 27 elastically yields when the control pin 12 is given a further rotation in the first angular direction A. The control pin 12 thus rotates (through the effect of the elastic yielding of the torsion spring) with respect to the control bush 13 (allowing the indexer 11 to reach the last stop area). Such a rotation takes the second portion 22b of the straight side 22 of the control pin 12 (previously not in abutment against the side edge 26 of the central aperture 24 of the cable-winding bush 13) in abutment against (or in any case towards) the first rectilinear segment 26a of a side edge 26 of the central aperture 24. Similarly, the second portion 22b of the other straight side 22 of the control pin 12 (previously not in abutment against the side edge 26 of the central aperture 24) is in abutment against (or in any case towards) the second rectilinear segment 26b of the other side edge 26 of the central aperture 24.

The torsion spring 27 comprises a first end 27a engaged and held in a seat 28 (for example a groove) of the control pin 12 and a second end 27b held in a seat 29 (for example a stem) of the cable-winding bush 13.

Figure 5:
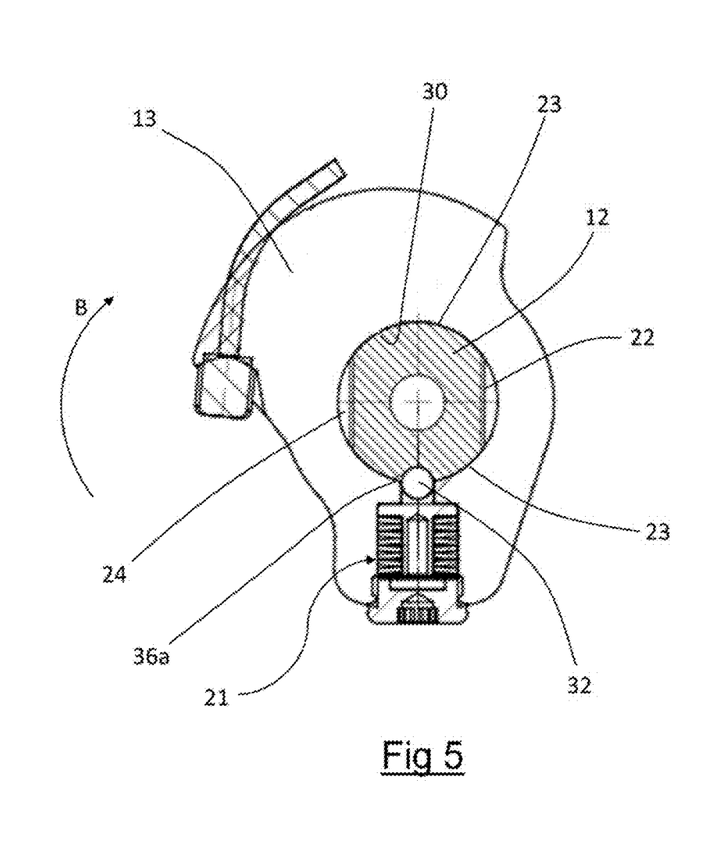
FIGS. 5 and 6 are schematic views of some details of the device of FIG. 1 in accordance with a second embodiment of the invention.
Figure 6:
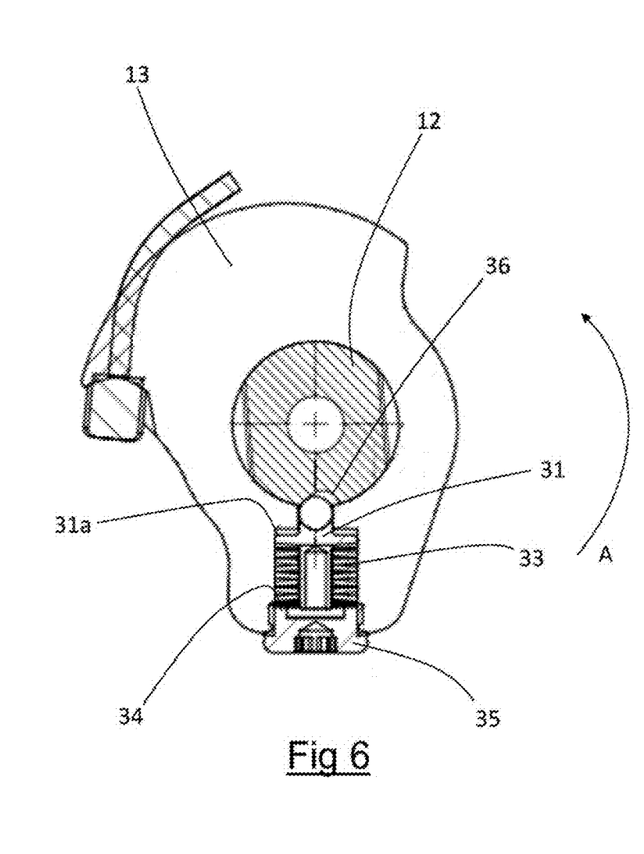

In a second embodiment of the invention, shown in FIGS. 5 and 6, the cable-winding bush 13 is again mounted coaxially to the control pin 12 about the rotation axis X. The control pin 12 has a shape in section similar to that of the first embodiment and has a prismatic shape and, perpendicular to the rotation axis X, has a section given by two straight sides 22, opposite and parallel to one another joined by curvilinear sides 23. Preferably, the curvilinear sides 23 have the shape of an arc of circle with center coinciding with the rotation axis X, as illustrated in FIG. 5.

The cable-winding bush 13 has a central aperture 24 crossed by the control pin 12. The central aperture 24 is delimited by a substantially circular edge 30 in which the radius of curvature of the edge 30 is identical to the radius of curvature of the arcs of circumference formed by the curvilinear sides 23 of the section of the control pin 12.

The cable-winding bush 13 comprises a seat 31 configured to house a slider 32 movable along a radial direction perpendicular to the rotation axis X.

The elastic members 21 comprise, in this embodiment, a linear spring 33, preferably a cup spring.

The linear spring 33 is inserted in the seat 31 and acts on the slider 32 to push it in the radially inner direction towards the control pin 12. The linear spring 33 is in abutment against a radially inner shoulder 31a of the seat 31 and against a radially outer shoulder 34 defined by a dowel 35 inserted in the seat 31. The dowel 35 is axially slidable and stoppable in a plurality of radial positions inside the seat 31 (for example through a screw coupling between the dowel 35 and the seat 31) so as to preload the linear spring 33 with different degrees of compression.

The control pin 12 comprises a recess 36 for receiving a portion of the slider 32.

In the embodiment illustrated in FIGS. 5 and 6, the slider is a ball and the recess 36 has a semi-spherical shape equipped with a guiding slide 36a arranged at one end of the recess 36.

When the cable-winding bush 13 is in any angular position between the first and the last winding position, the linear spring 33 pushes the slider 32 in the recess 36 coupling the cable-winding bush 13 and the control pin 12 with each other in rotation.

When the cable-winding bush 13 is in the last winding position and the derailleur is in abutment on the outer end stop, the linear spring 33 elastically yields and allows the slider 32 to move back in the seat 31 when the control pin 12 is given a further rotation in the first angular direction A.

In this condition, the slider 32 goes back in the seat 31 in contrast to the linear spring 33 freeing the recess 36 and allowing a rotation of the control pin 12 with respect to the cable-winding bush 13. For this purpose, the assisting slide 36a avoids jamming of the slider 32 in the recess 36.

Figure 7:
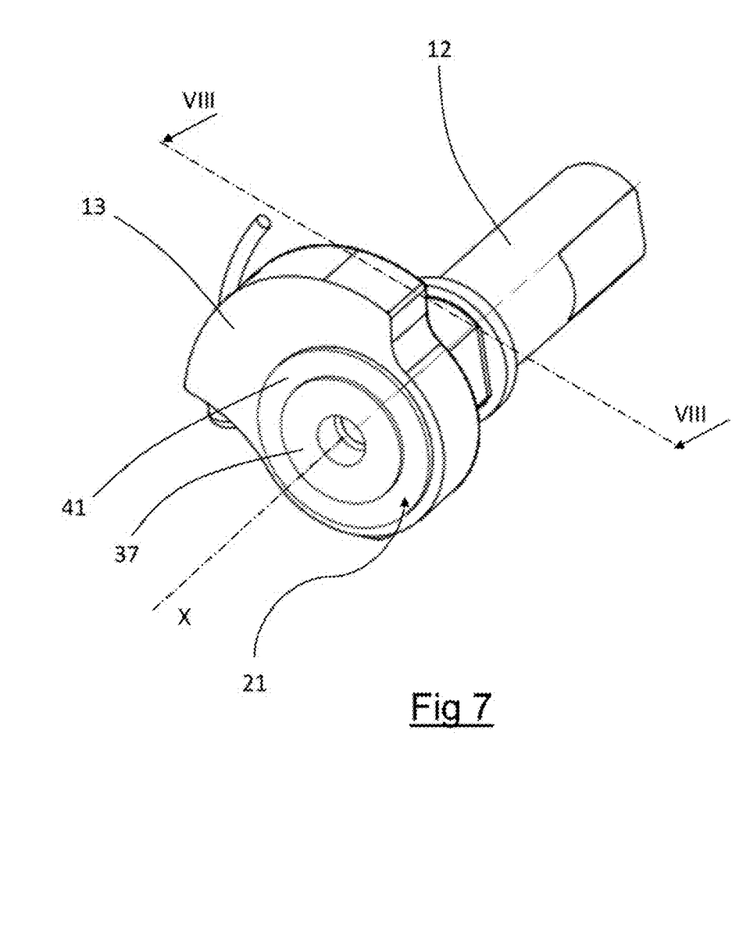
FIGS. 7 and 8 are schematic views of some details of the device of FIG. 1 in accordance with a third embodiment of the invention.
Figure 8:
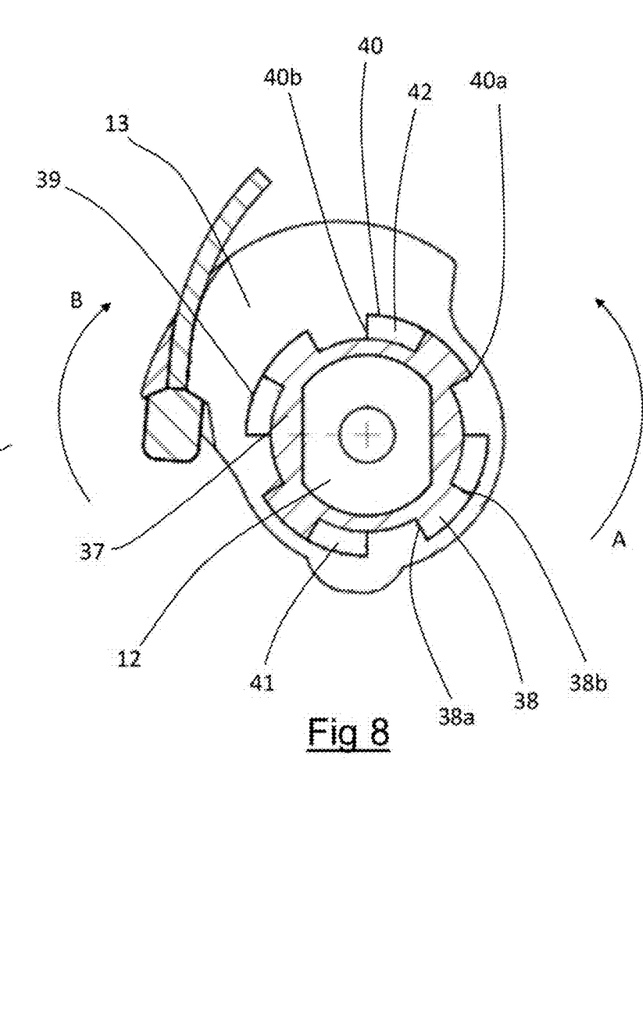

In a third embodiment of the invention, illustrated in FIGS. 7 and 8, on the control pin 12 a ferrule 37 is fitted, rotating as a unit with the control pin 12.

The ferrule 37 comprises a plurality of projections 38 that extend radially in the outward direction. Each projection 38 comprises a first 38a and a second shoulder 38b directed radially.

The cable-winding bush 13 receives the ferrule 37 in a through opening 39 thereof.

The through opening 39 is configured so as to define a plurality of seats 40 radially inward within the cable-winding bush 13 for receiving the cited projections 38.

The seats 40 have a first 40a and a second 40b abutment wall. The circumferential distance between the first 40a and the second wall 40b of the seats 40 is greater than the circumferential distance between the shoulders 38a, 38b of the projections 38 so that the projections 38 are received with a circumferential play in the seats 40.

The elastic members 21 comprise an insert 41 made of elastomeric material equipped with plugs 42 inserted in the seats 40.

The plugs 42 extend radially from a circular crown 43 of the insert 41 coaxial with the ferrule 37.

The plugs 42 have a circumferential extension equal to the difference between the circumferential extension between the seats 40 and the projections 38, so as to insert snugly in the space of the seats 40 not occupied by the projections.

As illustrated in FIG. 8, each plug 42 makes contact with the second shoulder 38b of a projection 38 and the second wall 40b of a seat 40. The first shoulder 38a of each projection 38 is in abutment on the first wall 40a of a respective seat 40.

The insert 41 made of elastomeric material, and in particular the plugs 42, when in the undeformed condition, rigidly couple in rotation the control pin 12 and the cable-winding bush 13.

When the insert 41 made of elastomeric material, and in particular the plugs 42, elastically deform, the control pin 12 can rotate with respect to the cable-winding bush 13. In this condition, indeed, the plugs 42 compress circumferentially, creating a play between the seats 40 of the cable-winding bush 13 and the projections 38 of the ferrule 37.

The insert 41 made of elastomeric material elastically deforms by rotations of the control pin 12 in the first angular direction A when the torque transmitted from the control pin 12 to the cable-winding bush 13 is greater than the torque necessary to rotate the cable-winding bush 13 in any winding position comprised between the first and the last winding position.

When the cable-winding bush 13 is in the last winding position and the derailleur is in abutment on the outer end stop, the plugs 42 elastically yield, compressing, when the control pin 12 is given a further rotation in the first angular direction A. The control pin 12 thus rotates (by means of the compression of the plugs 42) with respect to the control bush 13 (allowing the indexer 11 to reach the last stop area). In this situation, the first shoulders 38a of the projections 38 rotate with respect to the first walls 40a of the seats 40 moving angularly away from them by an amount equal to the relative rotation between the control pin 12 and the cable-winding bush 13.

Of course, those skilled in the art can bring numerous modifications and variants to the invention described above, in order to satisfy specific and contingent requirements, like for example foreseeing a plurality of stop areas at which the front derailleur is positioned on the crown gear of greatest size of the crankset, all in any case contained in the scope of protection of the present invention as defined by the following claims.

What is claimed is:

1. An actuation device for actuating a front derailleur of a bicycle, comprising:
    a control pin, configured to be set in rotation by a control lever, that is rotatable about a rotation axis (X) in a first angular direction (A) between a first angular position and a last angular position and in a second angular direction (B) between the last angular position and the first angular position;
    a cable-winding bush angularly rotatable about said rotation axis (X) in said first angular direction (A) to wind a control cable between a first winding position and a last winding position and in said second angular direction (B) to unwind said control cable between the last winding position and the first winding position;
    an indexer configured to define a plurality of stop areas for the rotation of said control pin, each stop area corresponding to an angular position comprised between said first angular position and said last angular position of said control pin; and,
    elastic members active between said control pin and said cable-winding bush configured to make the control pin fixedly connected to the cable-winding bush during rotations of the latter between the first winding position and the last winding position and between the last winding position and the first winding position and to make said control pin rotatable with respect to said cable-winding bush between the last winding position of the cable-winding bush and the last angular position of the control pin.

2. The actuation device according to claim 1, wherein an angular excursion between the first angular position and the last angular position of the control pin is greater than an angular excursion between the first winding position and the last winding position of the cable-winding bush.

3. The actuation device according to claim 2, wherein said rotation of the control pin with respect to said cable-winding bush between the last winding position of the cable-winding bush and the last angular position of the control pin elastically deforms said elastic members.

4. The actuation device according to claim 1, wherein said elastic members remain undeformed when a torque transmitted from the control pin to the cable-winding bush is equal to or less than the torque that the control pin exerts on the cable-winding bush to take the latter from the first to the last angular position.

5. The actuation device according to claim 1, wherein said elastic members elastically deform when a torque transmitted from the control pin to the cable-winding bush is greater than a torque exerted on the cable-winding bush to rotate it in any angular position comprised between the first and the last winding position.

6. The actuation device according to claim 1, wherein said elastic members comprise a torsion spring active between said cable-winding bush and said control pin, said torsion spring being mounted with a torsion preload greater than a torque necessary to rotate the cable-winding bush in any winding position comprised between the first and the last winding position.

7. The actuation device according to claim 6, wherein said cable-winding bush is mounted with a rotational play, about the rotation axis (X), on said control pin, that allows a relative rotation between control pin and cable-winding bush when said torsion spring elastically deforms.

8. The actuation device according to claim 7, wherein said rotational play is determined by a difference in shape between the control pin and a hole in the cable-winding bush in which the control pin is inserted.

9. The actuation device according to claim 1, further comprising a slider active between said control pin and said cable-winding bush to constrain said control pin and said cable-winding bush in rotation, said elastic members being active on said slider.

10. The actuation device according to claim 9, wherein said elastic members comprise a linear spring inserted in a seat of the cable-winding bush and active on said slider to push the slider in a recess of the control pin; said slider transferring a force to said linear spring proportional to a torque transmitted from the control pin to the cable-winding bush.

11. The actuation device according to claim 10, comprising a preload dowel active on said linear spring to adjust the preload thereof so that the linear spring deforms making the slider go back from said recess for pairs of forces transmitted to the cable-winding bush greater than or equal to a torque necessary to rotate the cable-winding bush in any winding position comprised between the first and the last winding position.

12. The actuation device according to claim 10, wherein said slider is inserted in said seat of the cable-winding bush to slide perpendicular to said rotation axis (X), said recess of the control pin housing a portion of said slider when the cable-winding bush and the control pin rotate as a unit.

13. The actuation device according to claim 1, further comprising a ferrule fixedly connected to said control pin and active on said cable-winding bush; said ferrule comprising radially outer projections inserted in radially inner seats of said cable-winding bush; said radially outer projections comprise a first and a second shoulder; said first shoulder being in abutment against a first wall of the radially inner seats when the cable-winding bush is in a position comprised between the first winding position and the last winding position.

14. The actuation device according to claim 13, wherein said elastic members comprise an insert made of elastomeric material inserted in said radially inner seats of the cable-winding bush and active between them and said radially outer projections of the ferrule.

15. The actuation device according to claim 14, wherein said insert made of elastomeric material is inserted between the second shoulders of the projections and second walls of the radially inner seats; said insert made of elastomeric material deforming elastically by rotations of the control pin in said first angular direction (A) when a torque transmitted from the control pin to the cable-winding bush is greater than a torque necessary to rotate the cable-winding bush in any winding position comprised between the first and the last winding position.

16. The actuation device according to claim 1, wherein said rotation of the control pin with respect to said cable-winding bush between the last winding position of the cable-winding bush and the last angular position of the control pin elastically deforms said elastic members.

17. The actuation device according to claim 16, wherein said elastic members remain undeformed when a torque transmitted from the control pin to the cable-winding bush is equal to or less than the torque that the control pin exerts on the cable-winding bush to take the latter from the first to the last angular position.

18. The actuation device according to claim 16, wherein said elastic members elastically deform when a torque transmitted from the control pin to the cable-winding bush is greater than a torque exerted on the cable-winding bush to rotate it in any angular position comprised between the first and the last winding position.

19. The actuation device according to claim 16, wherein said elastic members comprise a torsion spring active between said cable-winding bush and said control pin, said torsion spring being mounted with a torsion preload greater than a torque necessary to rotate the cable-winding bush in any winding position comprised between the first and the last winding position.

20. The actuation device according to claim 16, further comprising a ferrule fixedly connected to said control pin and active on said cable-winding bush; said ferrule comprising radially outer projections inserted in radially inner seats of said cable-winding bush; said radially outer projections comprise a first and a second shoulder; said first shoulder being in abutment against a first wall of the radially inner seats when the cable-winding bush is in a position comprised between the first winding position and the last winding position.

* * * * *